United States Patent [19]
Longshore et al.

[11] 3,987,879
[45] Oct. 26, 1976

[54] VEHICLE PARK-BRAKE AND GEAR SHIFTER WITH AN INTERLOCK

[75] Inventors: Donald W. Longshore; Ferdynand Kolacz, both of New Berlin, Wis.

[73] Assignee: Allis-Chalmers Corporation, Milwaukee, Wis.

[22] Filed: Nov. 17, 1975

[21] Appl. No.: 632,855

[52] U.S. Cl. .................................. 192/4 A; 74/477
[51] Int. Cl.² ........................................ B60K 29/02
[58] Field of Search ............... 192/4 A, 4 B, 4 C; 74/477, 471 XY

[56] References Cited
UNITED STATES PATENTS

| | | | |
|---|---|---|---|
| 1,285,601 | 11/1918 | Blasier | 192/4 A |
| 2,512,036 | 6/1950 | Orr | 74/477 X |
| 3,581,594 | 6/1971 | Longshore | 74/477 |
| 3,601,231 | 8/1971 | Kolacz | 192/4 A |

Primary Examiner—Benjamin W. Wyche
Attorney, Agent, or Firm—Arthur L. Nelson

[57] ABSTRACT

A vehicle park lock mechanism on a motor vehicle operated by a shift rail and shift lever to selectively operate the shifting of a gear ratio in the transmission and the park lock of the transmission drive shaft.

10 Claims, 6 Drawing Figures

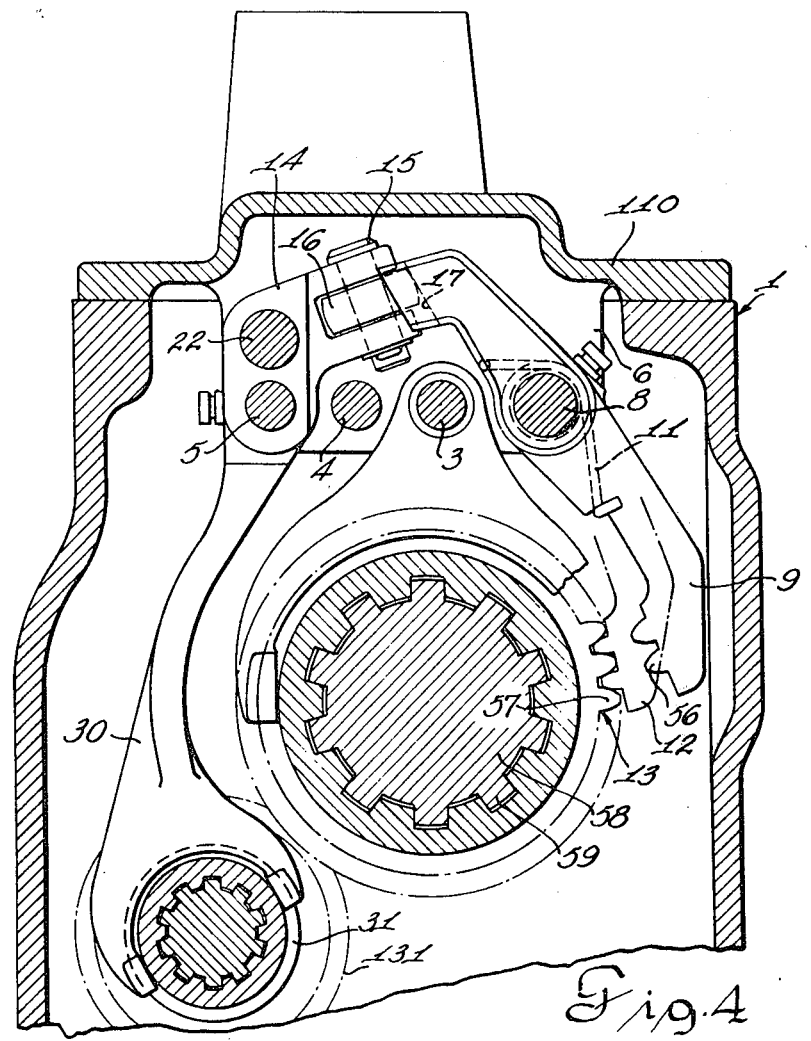
Fig. 4
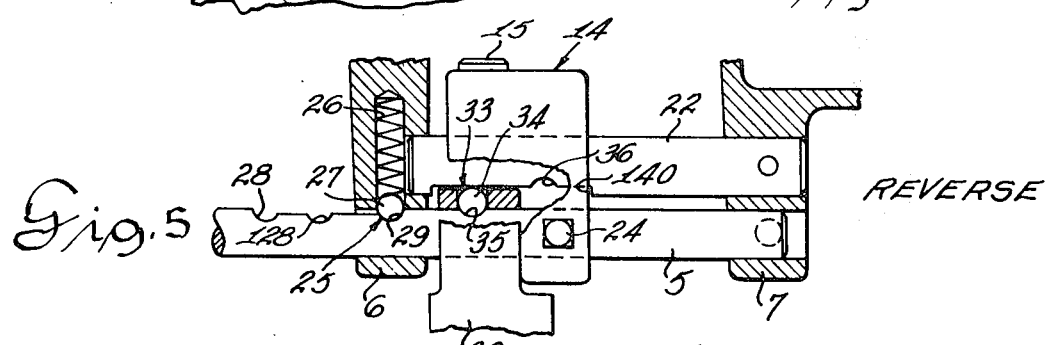
Fig. 5   REVERSE
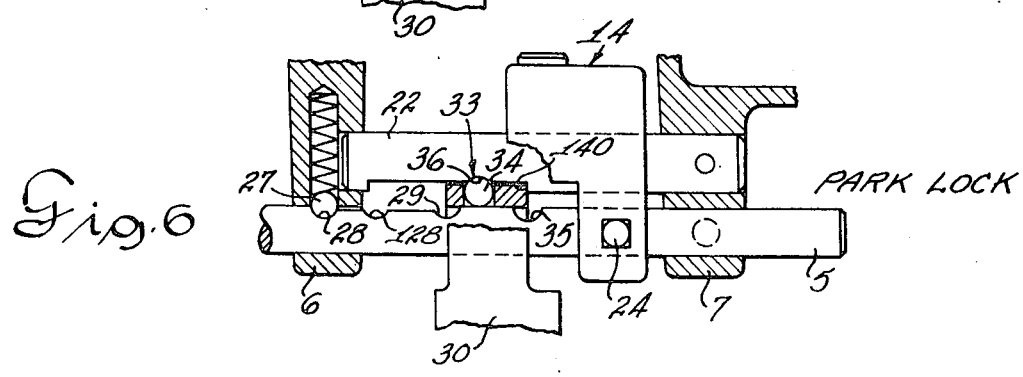
Fig. 6   PARK LOCK

VEHICLE PARK-BRAKE AND GEAR SHIFTER WITH AN INTERLOCK

This invention relates to a vehicle park lock and, more particularly, to a vehicle shift mechanism with multiple shift rails selectively operated by a shift lever with one rail operating the park lock on the vehicle drive shaft and the reverse gear ratio.

The conventional motor vehicle is provided with a hand-operated mechanical emergency brake as well as the conventional service brakes which are usually operated hydraulically. Although the service brakes are well adapted to stopping the vehicle, the emergency parking brake is also necessary in the event that the service brakes should fail. The emergency parking brakes are also used to prevent the vehicle from rolling when in a stationary position. It is, however, necessary under some circumstances to have a lock on the drive shaft which will prevent the vehicle from rolling particularly on a grade. By locking the drive shaft through a gear fixed to the drive shaft, the vehicle can be positively locked in the park position.

The conventional vehicle transmission having a mechanically shifted clutch collar to selectively engage the desired gear ratio usually employs a shift rail reciprocally mounted in the transmission housing which carries a shifting fork which is shifted in either of two directions by a shift lever to shift the transmission. In a multiple speed transmission, a selected number of shift rails may be used to shift the selected gear ratio of the transmission. The selected shift rail is engaged by moving the shift lever laterally before shifting the transmission. Accordingly, this invention provides for an additional shift rail which operates the reverse shifting of the transmission. A park lock carriage carrying a roller is also mounted on the shift rail to operate the park lock mechanism as the shift lever is moved in one direction. This provides a means for shifting the transmission by the shift lever and by selectively operating the park lock mechanism with the shift lever for locking the drive shaft of the vehicle to prevent movement of the vehicle once the vehicle is parked.

It is an object of this invention to provide a vehicle park lock mechanism on a multiple shift transmission with the park lock and reverse operated on the same shift rail.

It is another object of this invention to provide a vehicle park lock mechanism having a shift lever controlled shift rail selectively operating a shifting fork for shifting the transmission into reverse and a park lock carriage for operating the park lock mechanism on a drive shaft brake.

It is a further object of this invention to provide a vehicle park lock mechanism for a multiple speed transmission with shift rails for selected shifting gear ratios and a park lock mechanism operated by one of the shift rails to lock the vehicle drive shaft.

The objects of this invention are accomplished by providing an interlock on one of the shift rails in a multiple speed transmission. A park lock carriage carrying a roller is fixed to the shift rail, and as it reciprocates with the shift rail in one direction it operates against a cam on a pawl lever which in turn pivots a gear segment into the teeth of a braking gear on the vehicle drive shaft. As the roller on the park lock carriage rides up the ramp, it continues until it engages a surface parallel with the axis of the shift rail to lock the pawl lever in engagement with the braking gear on the drive shaft.

By reversing the movement of the shift lever, the park lock is disengaged by a countermovement of the pawl lever as the roller on the park lock carriage rides down the ramp and allows the pawl lever to disengage with the braking gear. As the shift rail movement is continued beyond the neutral position, a shift fork is engaged and an interlock locks the shift fork with the shift rail to shift the transmission in the reverse gear ratio. As the shift fork disengages the shift rail from the reverse ratio, the interlock carries the shifting fork with the shift rail until the interlock can be released when it returns to its neutral position. When the vehicle park lock is operated, the interlock between the shifting fork and the shift rail is released and the shift rail and the park lock carriage continue together while the shift fork remains stationary. Accordingly, a single rail is used to shift the transmission into the reverse gear ratio, as well as shifting the park lock carriage to operate the vehicle park lock mechanism.

The preferred embodiment of this invention is illustrated in the attached drawings.

FIG. 4 illustrates a cross-sectional view taken on line IV—IV of FIG. 2.

FIG. 5 is a cross-sectional view as viewed in FIG. 2 with the shift rail positioned in the reverse gear ratio position.

FIG. 6 is a cross-sectional view similar to FIG. 2 with the shift rail position in the park lock position.

Figure 1:
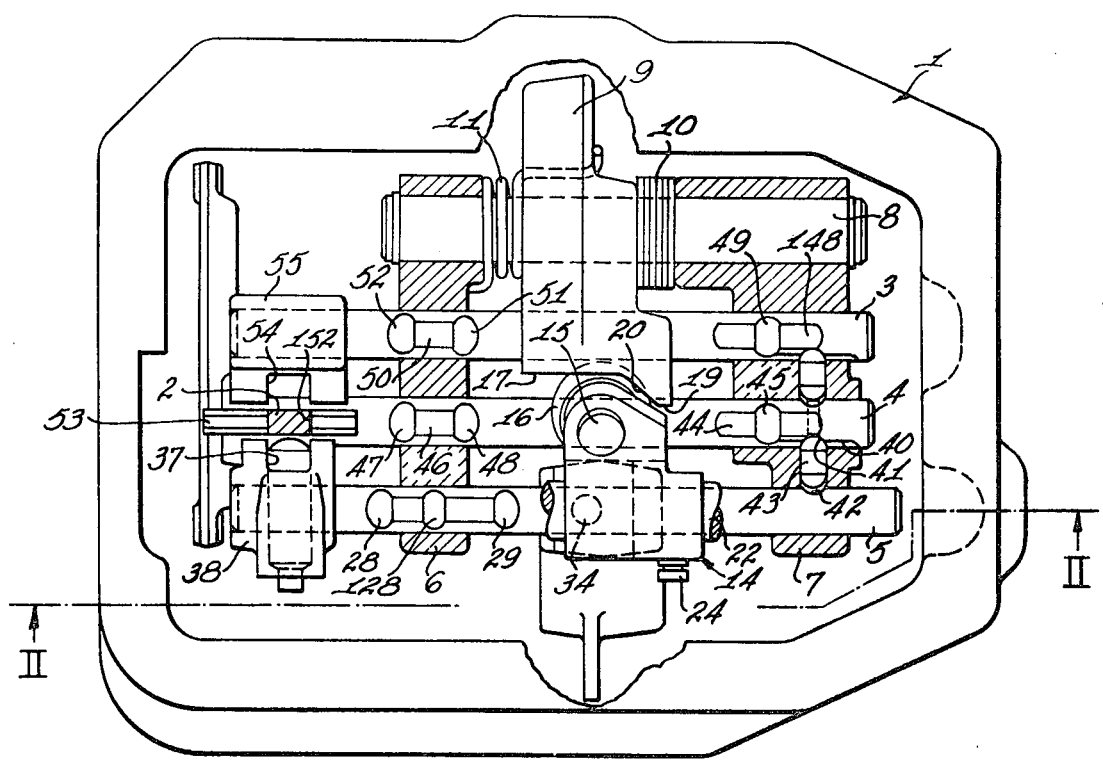
FIG. 1 illustrates a cross-sectional view showing the top of the transmission with the three shift rails of a mechanical shift transmission.

Referring to the drawings, FIG. 1 illustrates a cross-sectional view of the transmission with the cover plate removed. The transmission housing 1 carries the transmission and the shifting mechanism contained therein. The shifting mechanism includes a shift lever 2 which will selectively operate the shift rails 3, 4 and 5. The shift rails 3, 4 and 5 are mounted in the partitions 6 and 7 of the cover 110 of the transmission housing. The pivot pin 8 is pivotally supported in the partitions 6 and 7, and pivotally supports the pawl lever 9. The pawl lever 9 is biased against the shim 10 by the coil spring 11. The coil spring 11 normally biases the pawl lever 9 to the return position as shown in FIG. 4. The phantom position 12 of the pawl lever 9 shows the engaged position with the braking gear 13.

The park lock carriage 14 carries a shaft 15 rotatably supporting the roller 16 which engages the axial surface 17 on the pawl lever 9. The axial surface 17 is parallel with the axis of the shift rails as well as the surface 19. The ramp 20 causes the pawl lever 9 to pivot to the engaging position when the roller 16 rides up the ramp to the surface 19 in which the park lock mechanism engages the gear segment 56 of the pawl lever 9 with the braking gear 13.

The carriage 14 is slideably mounted on the carriage shaft 22 which is mounted in the transmission housing 1. The carriage shaft 22 is held in a nonrotating position by the pin 23 mounted in the housing 1 and extending through the carriage shaft 22.

The carriage 14 is also connected to the shift rail 5 by the screw 24. The carriage 14 rides with the shift rail 5 when the shift rail is moved axially by the shift lever 2. The shift rail 5 is selectively held in various positions by the detent 25 including the spring 26 and the ball 27. The recess 28 defines the park lock position for the shift rail and the recess 128 defines the neutral position while the recess 29 defines the reverse position of the shift rail 5.

The shift fork 30 reciprocally operates the shifting of the reverse gear ratio for the transmission by shifting the clutch collar 31 to engage a reverse gear 131 as the shift rail 5 is moved to the reverse position.

The reverse shift fork 30 is provided with a bearing end 32 which receives a shift rail 5 and slides on the shift rail 5 when the shift fork 30 is not in the interlocked position. The interlock 33 includes a ball 34 which selectively moves to the position in the recess 35 in the shift rail 5 or the recess 36 is the carrier shaft 22.

The shift lever 2 selectively engages a notch 37 in the lug 38 which is held on the shift rail 5 by the set screw 39. The shift rail 4 is formed with a flat 40 and an interlock recess 41. Similarly, the shift rail 5 is formed with an interlock recess 42. An interlock pin 43 selectively moves from one recess 41 to 42, and vice versa depending on which shift rail is moved. The flat 44 and recess 45 and the flat 46 and recesses 47 and 48 are provided for detents for selectively positioning the shift rail 4 in the neutral, third and fourth speed ratios.

The shift rail 3 is also provided with a flat 148 and recess 49, as well as the flat 50 and recesses 51 and 52, for engaging detent mechanisms for positioning the shift rails in the neutral, first and second position.

The shift lever 2 is received in slot 152 in the shift fork 53 to operate the shift rail 4 to shift the transmission in third and fourth speed ratio. Similarly, the slot 54 in the sleeve 55 on the shift rail 3 receives the shift lever 2 to shift the transmission in the first and second speed ratios.

Figure 3:
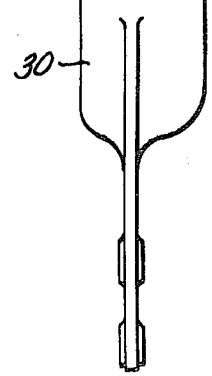
FIG. 3 is a diagram illustrating the sequence of shifting for the transmission.

FIG. 3 illustrates the shifting pattern for the positioning of the shift lever in the first, second, third and fourth gear ratios, as well as the park and reverse positions.

FIG. 5 illustrates the interlock mechanism 33 with the ball 34 positioned in the recess 35 of the shift rail 5. The ball 34 locks the shift rail to the shifting fork 30 so the shifting fork 30 and the carriage 14 move with the shift rail 5 to the reverse position. As the shift rail 5 is returned to the neutral position, the interlock 33 carries the shift fork 30 along with the shift rail. The carriage 14 slides on the carriage shaft 22.

The park lock position of the shift rail is shown in FIG. 6. The carriage 14, being fixed to the shift rail 5, rides along with the shift rail 5 and slides on the carrier rail 22. The interlock 33 is shown with the ball 35 in the recess 36 which locks the shift fork 30 with the carrier rail 22. The shift rail 5 is selectively moved by the shift lever 2 to the reverse position and a park lock position, as well as position the shift rail 5 in the neutral position.

The operation of the park lock mechanism will be described in the following paragraphs.

Figure 2:
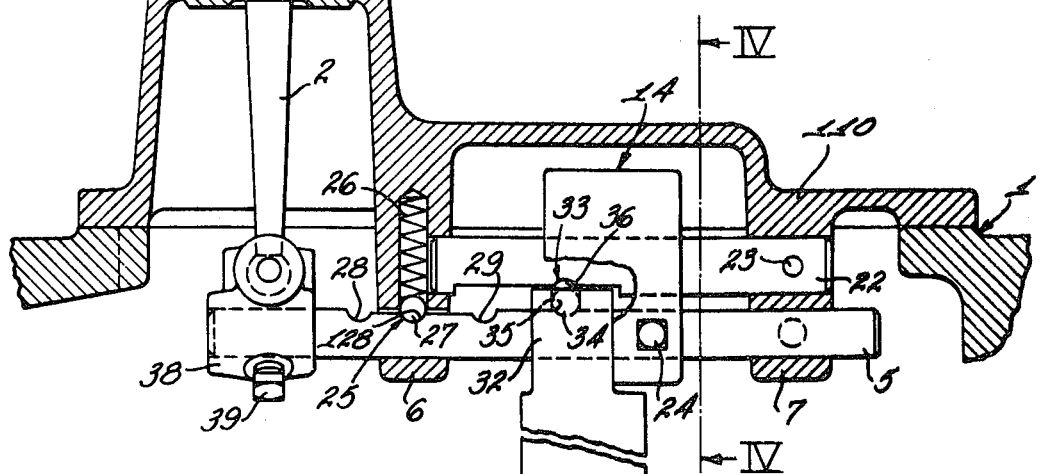
FIG. 2 is a cross-sectional view taken on line II—II of FIG. 1.

The shift lever 2 can be shifted to any of the positions shown in FIG. 3. When the shift lever 2 is shifted from the neutral position, as shown in FIG. 2, and the shift rail 5 is engaged, the shift rail can be shifted to the reverse position by moving the shift rail in the left-hand direction. The shift rail is moved by positioning the lever 2 in the slot 37 of the sleeve 38. The rail is then moved in the left-hand direction and the carriage 14 forces the ball 34 out of the recess 36. Ball 34 is then seated in the recess 35 and the reverse shift fork 30 moves along with the shift rail 5. When the detent ball 27 is in the slot 29, as shown, the shift rail 5 is in the reverse position. The carriage 14 and the reverse shift fork 30 move with the shift rail 5 to this position.

When the shift lever 2 is returned to its neutral position, the shift rail 5 is moved in the right-hand direction. The shift rail is locked with the reverse shifting fork 30 by the interlock 33. The interlock carries the reverse shift fork 30 with the shift rail 5 to the neutral position, as shown in FIG. 2. The carriage 14 is fastened to the shift rail 5 and reciprocally slides on the carrier rail 22. From the neutral position, as shown in FIG. 2, the park lock mechanism can be shifted to the park lock position as shown in FIG. 6. When the shift rail is moved by the shift lever 2 to the park lock position, as shown in FIG. 6, the ball 34 of the interlock 33 moves to the recess 36, as shown in FIG. 6. This allows the ball 34 to lift from the recess 35 and permit the shifting fork 30 to remain stationary as it engages the abutment 140 on the carrier rail 22. The carriage 14, however, being fixed to the shift rail 5 moves to the position as shown in FIG. 6. In the process of moving to the position as shown in FIG. 6, the roller 16 on the carriage 14 rides along the surface 17, up the ramp 20, to the locking surface 19.

As the carriage 14 moves in the right-hand direction, the pawl lever 9 is forced to pivot in a clockwise direction, as viewed in FIG. 4. The gear segment 56 of the pawl lever 9 engages the teeth 57 of the braking gear 13. The braking gear 13 is connected to the drive shaft 58 by the spline connection 59 between the braking gear 13 and the drive shaft 58. When the roller 16 is engaging the surface 19, the park lock mechanism is engaged and the shift rail 5 is in the position as shown in FIG. 6. The park lock mechanism is returned to the retracted position as shown in FIG. 4 by shifting the shift lever 2 to the neutral position and moving the shift rail 5 in the left-hand direction until the carriage 14 is in the position as shown in FIG. 2. The roller 16 rides down the ramp 20 to the surface 17, allowing the pawl lever to retract from engagement with the braking gear 13. The park lock mechanism is then retracted and the shift rail 5 is in neutral, as shown in FIG. 2.

The embodiments of the invention in which an exclusive property or privilege is claimed are defined as follows:

1. A vehicle park lock mechanism in a motor vehicle transmission comprising, a multiple speed transmission including, a shift lever pivotally mounted in the transmission, a shift rail mounted for reciprocal movement in said transmission for selective movement by said shift lever, a detent means for selectively holding said shift rail in a gear shift position, a neutral position, and in a park lock position, a park lock carriage mounted on said shift rail for movement with said shift rail and for operating a park lock pawl lever to lock a braking gear, a gear shift fork slideably mounted on said shift rail, an interlock selectively locking said shift fork with said shift rail as said carriage engages said shift fork and said shift rail moves to and from the shift position, abutment means engaging said shift fork causing said interlock to disengage said fork from said shift rail as said shift rail moves to the park lock position to thereby selectively shift said transmission by movement of said shift rail in a first direction and to operate the park lock mechanism of said transmission by movement of said shift rail in a second direction.

2. A vehicle park lock mechanism in the motor vehicle transmission as set forth in claim 1, including a carriage shaft slideably supporting said carriage with said shift rail.

3. A vehicle park lock mechanism in a motor vehicle transmission as set forth in claim 1, wherein said interlock includes a stationary element in said transmission, means on said stationary element defining a recess, a ball, means defining a recess on said shift rail, an opening in said shift fork permitting said ball to selectively move from said recess in said stationary member and said recess in said shift rail to selectively lock said shift fork to said shift rail.

4. A vehicle park lock mechanism in a motor vehicle transmission as set forth in claim 1, including a braking gear adapted for rotation with a drive shaft, a pawl lever pivotally mounted in said transmission having a pawl selectively and alternatively engaging and disengaging said braking gear, a ramp on said pawl lever for engaging said carriage as said carriage is reciprocated with said shift rail for engaging said pawl with said braking gear.

5. A vehicle park lock mechanism in a motor vehicle transmission as set forth in claim 1, including a second shift rail in said transmission, a second interlock for selectively locking one of said shift rails while the other of said shift rails is reciprocally moved by said control lever.

6. A vehicle park lock mechanism in a motor vehicle transmission as set forth in claim 1, wherein said shift fork defines a bearing end slideably mounted on said shift rail, a radial opening in said bearing end, said interlock includes a pawl received in said radial opening of said bearing end of said shift fork, a carriage shaft defining a recess for selectively receiving said pawl of said interlock, means defining a recess on said shift rail for selectively receiving said pawl for locking said shift fork with said shift rail when said shift rail is moved to the reverse shift position.

7. A vehicle park lock mechanism in a motor vehicle transmission as set forth in claim 1, including a carriage shaft mounted in said transmission slideably supporting said park lock carriage, means defining an abutment on said carriage shaft, for limiting the movement of said shift fork with said shift rail when said shift rail is moved to the park lock position.

8. A vehicle park lock mechanism in a motor vehicle transmission as set forth in claim 1, including a carriage shaft, said interlock including a pawl, a radial opening in a bearing portion of said shift fork, means defining a recess in said carriage shaft, means defining a recess in said shift rail, means selectively biasing said pawl in said recess on said carriage rail to lock said shift fork with said carriage rail and selectively biasing said pawl into the recess in said shift rail to lock said shift fork with said shift rail when said shift rail is moved to and from the shift position.

9. A vehicle park lock mechanism in a motor vehicle transmission as set forth in claim 1, including a carriage shaft, said interlock including an element selectively locking said shift fork to said shift rail to move said shift fork and shift rail in unison when said shift rail is moved from the neutral position to the shift position, and from the shift position to the neutral position.

10. A vehicle park lock mechanism in a motor vehicle transmission as set forth in claim 1, including a carriage shaft mounted in said transmission, said carriage reciprocally mounted on said carriage shaft, said interlock including means defining a recess on said carriage shaft, means defining a recess in said shift rail, said shift fork defining a bearing end slideably mounting on said shift rail, means defining a radial opening in said shift fork, an interlock element reciprocally moving in said radial opening as said interlock selectively locks said shift fork to said carriage shaft and said shift fork to said shift rail as shift rail is reciprocated by said shift lever.

* * * * *